United States Patent
Sato et al.

(10) Patent No.: US 10,335,684 B2
(45) Date of Patent: Jul. 2, 2019

(54) GAME SYSTEM, GAME PROCESSING METHOD, COMPUTER-READABLE NON-TRANSITORY STORAGE MEDIUM HAVING STORED THEREIN GAME PROGRAM, AND GAME APPARATUS

(71) Applicant: NINTENDO CO., LTD., Kyoto (JP)

(72) Inventors: Masanobu Sato, Kyoto (JP); Naoto Katsura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 3 days.

(21) Appl. No.: 15/608,223

(22) Filed: May 30, 2017

(65) Prior Publication Data

US 2018/0154264 A1 Jun. 7, 2018

(30) Foreign Application Priority Data

Dec. 6, 2016 (JP) ................................. 2016-237135

(51) Int. Cl.
*G06F 3/01* (2006.01)
*A63F 13/44* (2014.01)
(Continued)

(52) U.S. Cl.
CPC .......... *A63F 13/56* (2014.09); *A63F 13/2145* (2014.09); *A63F 13/44* (2014.09);
(Continued)

(58) Field of Classification Search
CPC ......... A63F 13/56; A63F 13/822; G06F 3/011
See application file for complete search history.

(56) References Cited

U.S. PATENT DOCUMENTS

2007/0265082 A1* 11/2007 Shimura ................. A63F 13/10
463/37
2010/0304870 A1 12/2010 Asuke
(Continued)

FOREIGN PATENT DOCUMENTS

| EP | 1 854 520 A1 | 11/2007 |
| EP | 2 233 181 A2 | 9/2010 |
| JP | 2010-273946 | 12/2010 |

OTHER PUBLICATIONS

Extended European Search Report dated Nov. 21, 2017 issued in 17173226.6 (10 pgs.).

*Primary Examiner* — William H McCullouch, Jr.
*Assistant Examiner* — Yingchuan Zhang
(74) *Attorney, Agent, or Firm* — Nixon & Vanderhye, P.C.

(57) ABSTRACT

A first determination region, a second determination region, and a third determination region are set for each non-operation target object. When an operation target object is located within the first determination region, it is determined that the operation target object has collided with the non-operation target object, and a process is performed. In addition, when a touch input is performed in a state where the operation target object is located within the second determination region, it is determined that the operation target object has collided with the non-operation target object, and a process is performed at this time. Moreover, when the operation target object is located within the third determination region, movement control of the operation target object is performed such that the operation target object avoids a collision with the non-operation target object.

19 Claims, 13 Drawing Sheets

(51) Int. Cl.
*A63F 13/52* (2014.01)
*A63F 13/56* (2014.01)
*A63F 13/80* (2014.01)
*A63F 13/577* (2014.01)
*A63F 13/822* (2014.01)
*A63F 13/2145* (2014.01)

(52) U.S. Cl.
CPC ............ *A63F 13/52* (2014.09); *A63F 13/577* (2014.09); *A63F 13/80* (2014.09); *A63F 13/822* (2014.09); *G06F 3/011* (2013.01)

(56) References Cited

U.S. PATENT DOCUMENTS

| | | | |
|---|---|---|---|
| 2011/0172013 A1* | 7/2011 | Shirasaka | G06F 3/0488 463/37 |
| 2014/0028544 A1* | 1/2014 | Amano | G09G 5/00 345/156 |
| 2016/0317915 A1* | 11/2016 | Onda | A63F 13/2145 |
| 2017/0060369 A1* | 3/2017 | Goyal | G06F 3/011 |

\* cited by examiner

GAME SYSTEM, GAME PROCESSING METHOD, COMPUTER-READABLE NON-TRANSITORY STORAGE MEDIUM HAVING STORED THEREIN GAME PROGRAM, AND GAME APPARATUS

CROSS REFERENCE TO RELATED APPLICATION

The disclosure of Japanese Patent Application No. 2016-237135, filed on Dec. 6, 2016, is incorporated herein by reference.

FIELD

The exemplary embodiments herein relate to a game system, and more particularly relate to a game system that causes a computer of an information processing apparatus including a touch input section to execute an action game in which a screen scrolls in a predetermined direction.

BACKGROUND AND SUMMARY

Hitherto, a scroll-type jumping action game is known.

In the above game, a determination region for determining a collision between an enemy object or the like and a player object is used. However, in the above conventional game, for example, only one determination region is set for one enemy object. Thus, also regarding a motion of the player object accompanying a collision, the player object is caused to merely perform a monotonous motion (e.g., reproduction of a motion representing a state where the player object is damaged is merely performed). In addition, there is also an aspect that a complicated operation is required in the case of performing complicated motion control on the player object.

Therefore, it is an object of the exemplary embodiments to provide a game system and the like that can perform various types of motion/movement control on a player object regarding a collision with a predetermined object while providing simple operability to a player.

In order to attain the object described above, the following configuration examples are exemplified.

A configuration example is directed to a game system including a touch screen, an operation target moving section, a display control section, a movement control section, a first collision determination processing section, a second collision determination processing section, and a third collision determination processing section. The operation target moving section automatically moves an operation target object that is an operation target of a player, in a predetermined direction within a virtual space. The display control section displays, on the touch screen, a game screen that scrolls so as to follow movement of the operation target object. The movement control section performs predetermined movement control on the operation target object on the basis of a touch input from the player on the touch screen. When the operation target object is located within a first determination region set for a non-operation target object, which is an object different from the operation target object, so as to be located at a position overlapping the non-operation target object, the first collision determination processing section determines that the operation target object has collided with the non-operation target object, change a display form of the non-operation target object to a first display form, and performs first movement control on the operation target object. When a touch input is performed in a state where the operation target object is located within a second determination region set for the non-operation target object so as to be wider in the predetermined direction and a direction orthogonal to the predetermined direction than the first determination region, the second collision determination processing section determines that the operation target object has collided with the non-operation target object, changes the display form of the non-operation target object to the first display form, and performs second movement control, which is different from the first movement control, on the operation target object. When the operation target object is located within a third determination region set for the non-operation target object so as to be located at a side in a direction opposite to the predetermined direction with respect to a position of the first determination region and at a position adjacent to the first determination region, the third collision determination processing section performs third movement control, which is different from the first movement control and the second movement control, on the operation target object such that the operation target object avoids a collision with the non-operation target object. When a touch input is performed while the third movement control is performed, the third collision determination processing section changes the display form of the non-operation target object to the first display form without performing the process by the first collision determination processing section and the process by the second collision determination processing section.

According to the above configuration example, by combining a plurality of the collision determinations, the diversity of motions of the operation target object can be increased while simple operability is maintained. That is, in the case of causing the operation target object to perform a complicated motion, an operation performed by the player generally becomes complicated, but, in the above configuration example, it is possible to cause the operation target object to perform various motions related to a collision with the non-operation target object, even with a user interface with which only one operation is permitted for the player, for example, an operation that can be performed by the player is only a tap operation for causing the operation target object to jump.

In another configuration example, when a touch input is performed while the third movement control is performed, the third collision determination processing section may change the display form of the non-operation target object to the first display form and further performs fourth movement control, which is different form the third movement control, on the operation target object.

According to the above configuration example, it is possible to cause the operation target object to perform more various motions.

In another configuration example, a position and a size of the second determination region may be set such that the second determination region partially overlaps the first determination region and the third determination region.

According to the above configuration example, by expanding the cover range of the second determination region, it is made easier to reflect the intention of a player's operation. In addition, in performing the process by the second collision determination processing section, causing a feeling of discomfort to the player can be reduced.

In another configuration example, the game system may further include a fourth collision determination process section determines whether the operation target object is located within a fourth determination region that is a region set in advance for the non-operation target object and includes the third determination region. The process by the third collision determination processing section may be performed only when the operation target object is located within the fourth determination region. In addition, the fourth determination region is set so as to include entireties of the first determination region and the third determination region and so as to include at least a region at the side in the direction opposite to the predetermined direction with respect to a position of the third determination region. Furthermore, the game system may further include a determination region setting section setting the third determination region with a size different in accordance with a moving speed of the operation target object and setting the fourth determination region with a fixed size regardless of the moving speed of the operation target object.

According to the above configuration example, since the process using the third determination region is performed only when the operation target object is located within the fourth determination region, the processing load can be reduced. In addition, the determination process using the third determination region can be more appropriately performed in accordance with the moving direction of the operation target object.

In another configuration example, as a result of the determination as to whether the operation target object is located within the second determination region, when it is determined that the operation target object is not located within the second determination region, the game system determines whether the operation target object is located within the third determination region, and further when it is determined that the operation target object is not located within the third determination region, the game system may perform the process by the first collision determination processing section.

According to the above configuration example, a plurality of the determination processes can be efficiently performed, so that the processing efficiency of the game system can be enhanced and the processing load can be reduced.

In another configuration example, the second collision determination processing section may include a moving direction condition determination section further determining whether a predetermined condition regarding a moving direction of the operation target object is satisfied, after it is determined that the operation target object is located within the second determination region. When it is determined that the predetermined condition regarding the moving direction of the operation target object is satisfied, a process of change of the display form of the non-operation target object and movement control on the operation target object may by performed. In addition, the second collision determination processing section may include a first positional relationship condition determination section further determining whether a predetermined condition regarding a positional relationship between the operation target object and the non-operation target object is satisfied, after it is determined that the operation target object is located within the second determination region. When it is determined that the predetermined condition regarding the positional relationship is satisfied, a process of change of the display form of the non-operation target object and movement control on the operation target object may be performed.

According to the above configuration example, causing a feeling of discomfort and unnaturalness to the player can be reduced.

In another configuration example, the third collision determination process section may include a moving speed condition determination section further determining whether a predetermined condition regarding a moving speed of the operation target object is satisfied, when it is determined that the operation target object is located within the third determination region. When it is determined that the predetermined condition regarding the moving speed is satisfied, a process of the third movement control may be performed.

According to the above configuration example, in the relationship between the moving speed of the operation target object and the process by the third collision determination process section, causing a feeling of discomfort and unnaturalness to the player can be reduced.

In another configuration example, the third collision determination process section may include a second positional relationship condition determination section further determining whether a predetermined condition regarding a positional relationship between the operation target object and the non-operation target object, after it is determined that the operation target object is located within the third determination region. When it is determined by the second positional relationship condition determination section that the predetermined condition regarding the positional relationship is satisfied, a process of the third movement control may be performed. Furthermore, even when it is determined that the predetermined condition regarding the positional relationship is not satisfied, if the operation target object is located on a predetermined terrain object that is defined in advance, the second positional relationship condition determination section may determine that the predetermined condition regarding the positional relationship is satisfied.

According to the above configuration example, in the relationship between: the positional relationship between the operation target object and the non-operation target object; and the process by the third collision determination process section, causing a feeling of discomfort and unnaturalness to the player can be reduced.

In still another configuration example, the game system may further include a speed reduction processing section reducing a moving speed of the operation target object in accordance with a touch position being continuously changed toward the direction opposite to the predetermined direction after the touch input is performed.

According to the above configuration example, it is possible to cause the operation target object to perform more various motions.

In addition, another configuration example is directed to a game apparatus including a touch screen, an operation target moving section, a display control section, a movement control section, a first collision determination processing section, and a second collision determination processing section. The operation target moving section automatically moves an operation target object that is an operation target of a player, in a predetermined direction within a virtual space. The display control section displays, on the touch screen, a game screen that scrolls in accordance with movement of the operation target object. The movement control section performs predetermined movement control on the operation target object on the basis of a touch input from the player on the touch screen. When the operation target object is located within a first determination region set for a predetermined non-operation target object, which is an object different from the operation target object, so as to be located at a position overlapping the non-operation target object, the first collision determination processing section determines that the operation target object has collided with the non-operation target object, and performs first movement control accompanying a collision, on the operation target object. When a touch input is performed in a state where the operation target object is located within a second determination region set for the non-operation target object so as to be wider in the predetermined direction and a direction orthogonal to the predetermined direction than the first determination region, the second collision determination processing section determines that the operation target object has collided with the non-operation target object, and performs second movement control accompanying a collision, on the operation target object.

According to the above configuration example, the diversity of motions of the operation target object can be increased while simple operability is maintained. That is, in the above configuration example, it is possible to cause the operation target object to perform various motions related to a collision with the non-operation target object, even with a user interface with which only one operation is permitted for the player.

According to the present embodiment, in a forced scroll-type action game, various types of movement control can be performed on the operation target object while simple operability is provided to the player.

DETAILED DESCRIPTION OF NON-LIMITING EXAMPLE EMBODIMENTS

Hereinafter, an exemplary embodiment will be described.

Figure 1:
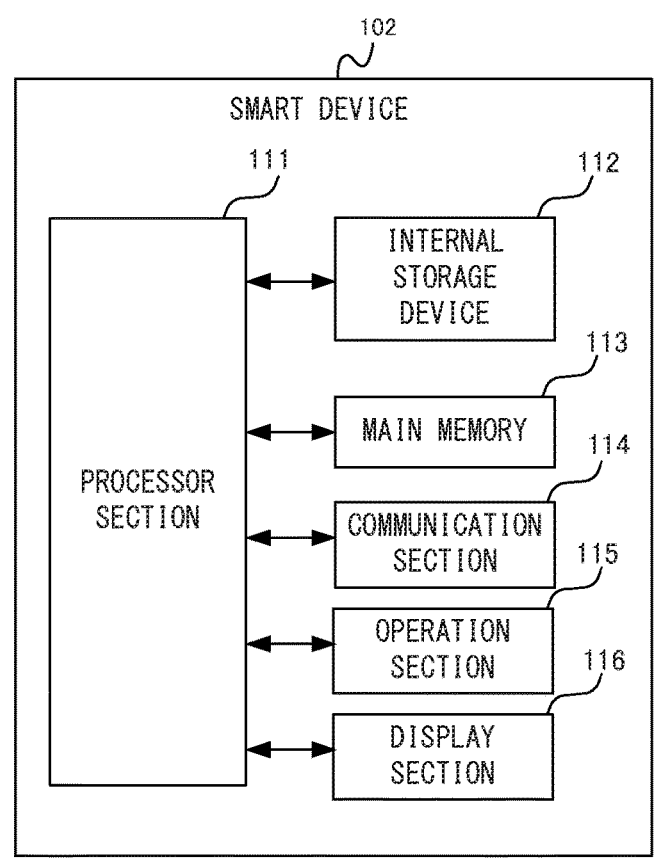
FIG. 1 is a functional block diagram of a portable smart device 102.

FIG. 1 is a functional block diagram of a portable smart device 102 (hereinafter, referred to merely as smart device) that is an example of an information processing apparatus according to the present embodiment. In FIG. 1, the smart device 102 includes a processor section 111, an internal storage device 112, a main memory 113, a communication section 114, an operation section 115, and a display section 116. The processor section 111 executes later-described information processing and executes a system program (not shown) for controlling overall operation of the smart device 102, thereby controlling operation of the smart device 102. The processor section 111 may include a single processor or a plurality of processors. The internal storage device 112 stores therein various programs to be executed by the processor section 111, and various kinds of data to be used in the programs. The internal storage device 112 is, for example, a flash EEPROM or a hard disk device. The main memory 113 temporarily stores therein computer programs and information. The communication section 114 is able to establish a connection to a network by wired or wireless communication and transmit/receive predetermined data to/from a predetermined server or another smart device. The operation section 115 is, for example, an input device for receiving an operation from a user. The display section 116 is typically a liquid crystal display unit. In processing according to the present embodiment, a touch panel (touch screen) integrated with a liquid crystal screen is assumed as the operation section 115 and the display section 116. In another embodiment, a predetermined pointing device other than a touch panel may be used as the operation section 115.

In the present embodiment, an example in which later-described game processing is performed in the smart device 102 will be described, but processing according to the embodiment described below is also applicable to a portable game apparatus or the like as the information processing apparatus.

Figure 2:
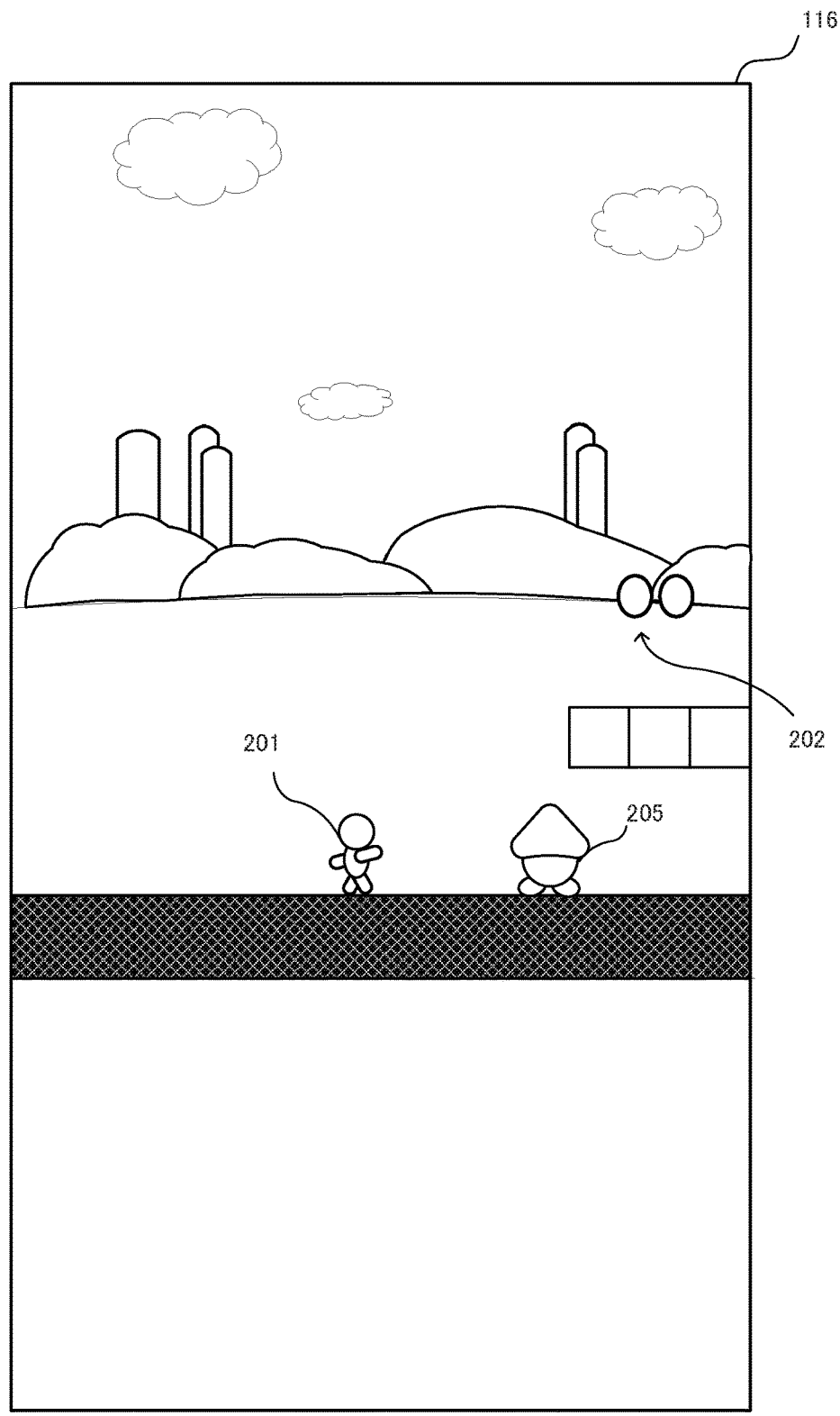
FIG. 2 shows a non-limiting example of a game screen according to an embodiment.

Next, an operation outline of information processing according to the present embodiment will be described. The processing according to the present embodiment assumes a horizontal scroll-type jumping action game. More specifically, the game assumed in the present embodiment is a jumping action game in which a screen automatically scrolls in the horizontal direction. That is, the game is a game in which a screen automatically scrolls by a player object automatically moving without any operation of a player (even when a movement instruction input is not performed from the player). FIG. 2 shows an example of a game screen according to the present embodiment. In FIG. 2, a player object 201, coin objects 202, and an enemy object 205 are shown. In this game, in principle, the player object 201 automatically moves rightward on the screen. In conjunction with the movement of the player object 201, the screen also automatically and horizontally scrolls (in other words, the scroll forcedly and horizontally scrolls). In addition, at this time, in principle, the display position of the player object 201 on a screen horizontal direction axis (horizontal axis) in the screen (display area) is not changed and is maintained at a predetermined position. In the present embodiment, the display position on the horizontal axis is set at a center portion of the screen.

Scroll control will be specifically described. First, a virtual camera is disposed in a virtual game space such that the player object 201 is located in a forward direction of the virtual camera. The virtual camera moves in conjunction with the movement of the player object 201 so as to keep this positional relationship. In other words, control is performed in which the display area is scrolled in the horizontal direction of the screen so as to follow the movement of the player object 201. This control of following may be control in which the display area is caused to follow the movement of the player object 201 without temporal delay, or may be control in which the display area is caused to follow the movement of the player object 201 with a slight delay.

The display position of the player object 201 is not limited to the above position. In another embodiment, the player object 201 may be fixedly displayed at a position slightly leftward of the center of the screen on the horizontal axis such that a more wide area at the advancing direction side can be viewed. In addition, the present embodiment is described with, as an example, the game in which the screen forcedly and horizontally scrolls. However, the scroll direction is not limited to the horizontal direction. In another embodiment, the scroll direction may be a vertical direction or an oblique direction.

In addition, the basic object of this game is to try to reach a finish point (within a time limit) while collecting coin objects 202 disposed in a game course. In this game, a "result screen" (not shown) is displayed after the game course is cleared, and the number of acquired coin objects 202 (this also means a score) is displayed therein.

Next, an operation of the player in this game will be described. In this game, an operation performed by the player during game play is basically only a tap operation. Specifically, the player can cause the player object to "jump" by performing a tap operation on the screen. In addition, regarding a position at which the tap operation is performed, the player may tap any position on the screen except a specific button region and the like. That is, it can be said that this game provides simple operability in which the player object 201 is merely caused to jump by tapping the screen, to the player (since any position on the screen may be tapped in principle). In addition, the height of the jump can be changed in accordance with the duration of the tap operation, and it is possible to cause the player object 201 to jump higher when the time for which the player taps the screen is longer (the player holds the tap operation longer) (other operations that can be performed by the player include a menu operation and the like, but those operations are not directly relevant to the processing of the present embodiment, and thus the description of processing regarding the operations is omitted). The player can cause the player object 201 to attack the enemy object 205 or jump over the enemy object 205 or various obstacles, by performing a tap (jump operation) at good timing, and thereby can cause the player object 201 to advance for the finish point.

In addition, in this game, a "brake" can be applied to the jump movement by performing an operation in which, while a state of touching the screen is continued, the touch position is moved. Specifically, the speed of the player object 201 in the advancing direction (specifically, the direction in which the player object 201 automatically moves) is reduced to apply a "brake" by performing such an operation in the direction opposite to the advancing direction during a jump of the player object 201. Accordingly, it is possible for the player to slightly adjust the landing position of a jump.

Here, actions that can be taken by the player object 201 with respect to the enemy object 205 in this game will be described. In this game, the player object can be caused to perform the following actions with respect to the enemy object.

(Attack Action by Fall Movement after Jump)

Figure 3:
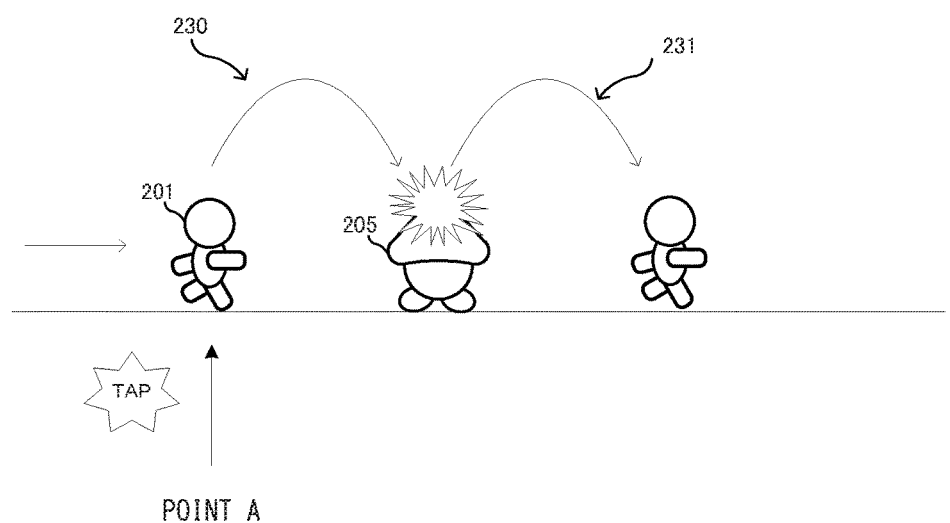
FIG. 3 is a diagram for explaining an attack action by a fall movement after a jump.

First, an enemy object can be eliminated (damaged) by causing the player object 201 to jump and land on the enemy object. FIG. 3 shows an example of such an action. FIG. 3 shows an example in the case where the player object 201 runs rightward on the ground and the enemy object 205 is present in the advancing direction of the player object 201. For example, it is assumed that the player performs a tap operation at the time at which the player object 201 reaches a point A. Accordingly, the player object 201 jumps (a trajectory 230 in FIG. 3: a jump by a tap operation during running on the ground). Then, the enemy object 205 is present at a position that is the landing point of the jump. Thus, the player object 201 lands on the head portion of the enemy object 205. As a result, the player object 201 can trample the enemy object 205 to eliminate the enemy object 205. In other words, the player can cause the player object 201 to attack the enemy object 205 by performing a tap operation at timing that allows the player object 201 to land on the enemy object 205. In addition, the display form of the trampled enemy object 205 is changed. Specifically, a motion indicating that the enemy object 205 is attacked and eliminated is displayed. In addition, the player object 201 that has trampled the enemy object 205 makes a jump movement in "reaction" to the trample (a trajectory 231 in FIG. 3: a jump in reaction to trampling the enemy object 205 by fall after the jump).

(Attack Action Through Tap Operation)

In addition, in this game, a trample attack by landing on the head portion of an enemy (hereinafter, referred to as trample attack through a tap operation) can be performed on an enemy object 205 present below the player object 201 (an enemy object 205 moving on the ground or an enemy object 205 present in the air) by performing a tap operation in a state where the player object 201 is in the air in a virtual space. Hereinafter, examples regarding an attack on an enemy present in the air will be described.

Figure 4:
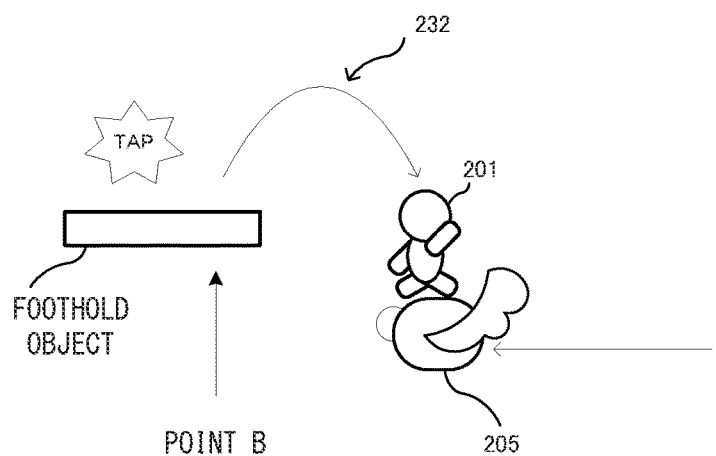
FIG. 4 is a diagram for explaining an attack action in the air.
Figure 5:
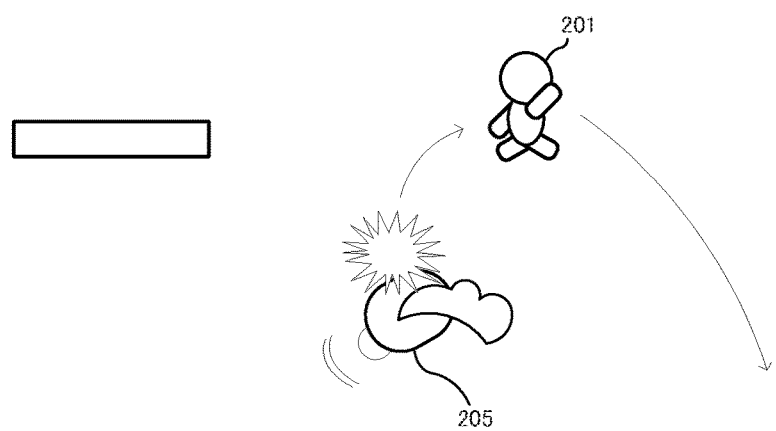
FIG. 5 is a diagram for explaining the attack action in the air.

FIG. 4 shows an example of an attack by a fall movement after a jump on an enemy object 205 present in the air. FIG. 4 shows the enemy object 205 flying straight leftward in the air within the virtual space. In such a situation, it is assumed that the player object 201 jumps at a point B (a tap operation is performed at the time at which the player object 201 is present at the point B). As a result, the player object 201 moves as indicated by a trajectory 232 and lands on the upper portion of the enemy object 205. In this case, as shown in FIG. 5, the player object 201 tramples the enemy object 205 and further makes a jump movement in reaction to the trample. The jump movement in reaction to the trample is the same movement as the jump movement in reaction shown in FIG. 3 (is the same jump as indicated by the trajectory 231). In addition, the display form of the trampled enemy object 205 is changed, and a motion indicating that the enemy object 205 is eliminated is displayed.

Next, a trample attack, through a tap operation, on the enemy object 205 present in the air will be described. For example, in a situation where the player object 201 can land on the enemy object 205 as shown in FIG. 4, when a tap operation is performed before the player object 201 actually lands on the enemy object 205 (i.e., in a state where the player object 201 is in the air), a trample attack corresponding to the tap operation of the player occurs. An action of the player object 201 during a jump after the trample at this time is different from that during the above jump movement in reaction. Specifically, an action in which the player object 201 jumps while rolling is performed (not shown).

Figure 6:
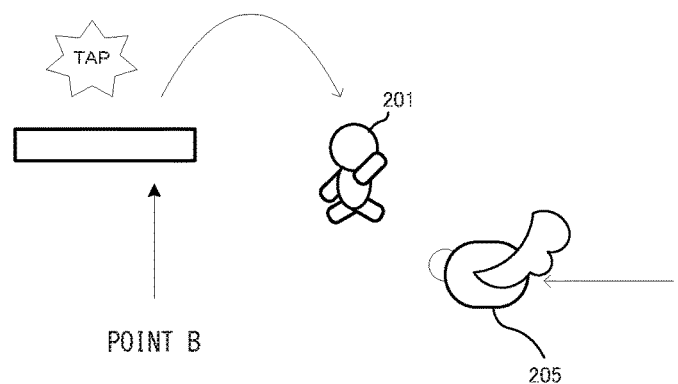
FIG. 6 is a diagram for explaining the attack action in the air.
Figure 7:
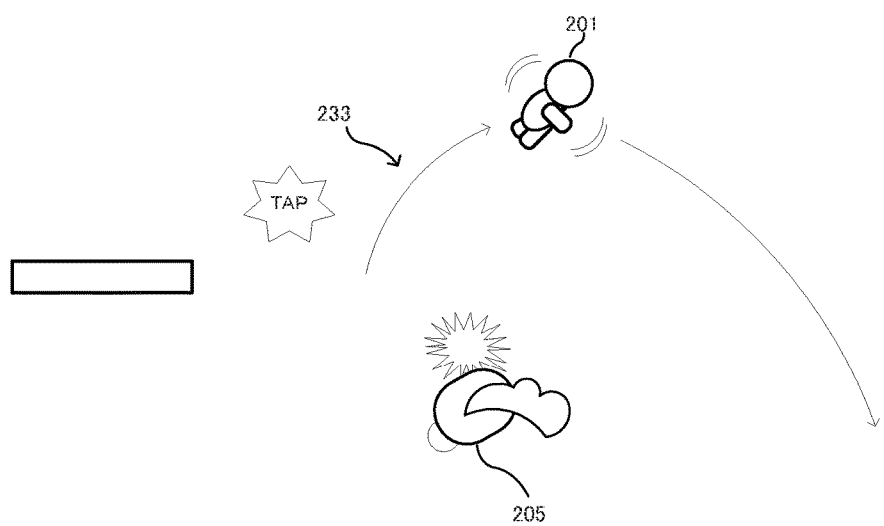
FIG. 7 is a diagram for explaining the attack action in the air.

Here, in this game, in order to easily reflect the intention of a tap operation performed by the player to game play, the following processing is also performed for a trample attack through the tap operation when the player object 201 is in the air. First, as shown in FIG. 6, in a situation where the enemy object 205 is flying leftward, it is assumed that a tap operation is performed at the time at which the player object 201 is located at the point B. At this time, unlike the above case of FIG. 4, in FIG. 6, the situation is assumed in which the enemy object 205 is not present on the trajectory of fall in the jump. That is, the situation is assumed in which the player object 201 will not land on the enemy object 205. In this game, when the player performs a tap operation in the state of FIG. 6, processing is performed such that a trample attack through the tap operation is performed on the enemy object 205 as shown in FIG. 7. That is, although the player object 201 actually does not land on the enemy object 205, at the time point at which the tap operation is performed, the player object 201 is caused to perform a jump action with a position under the foot of the player object 201 at this time as a base (an action in which the player object 201 jumps while rolling is also performed at this time), and the same processing as in the case where the enemy object 205 is trampled (change of the display form, etc.) is performed on the enemy object 205.

(Automatic Avoidance Action)

Figure 8:
FIG. 8 is a diagram for explaining an automatic avoidance action.
Figure 9:
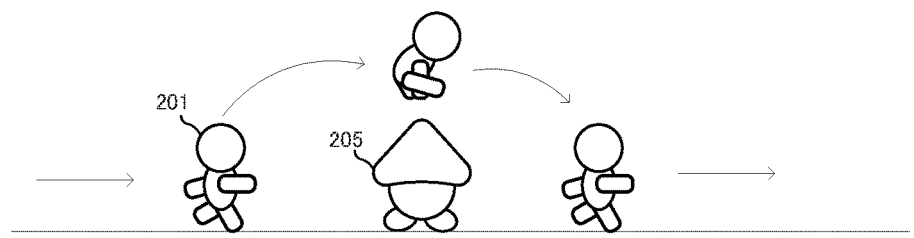
FIG. 9 is a diagram for explaining the automatic avoidance action.

Next, still another action will be described. In this example, in the case of a situation where the player object 201 comes close to the enemy object 205 present in the advancing direction of the player object 201 while running on the ground, and further a tap operation is not performed, an action is also performed in which the player object 201 automatically avoids the enemy object 205 with which the player object 201 is about to come into contact (collide). Specifically, an action of "leapfrog" in which the player object 201 jumps over the enemy object 205 (hereinafter, referred to as leapfrog action) is automatically performed. This action can be referred to as third movement control that is different from the above attack action by fall movement after a jump (first movement control) and the above attack action through a tap operation (second movement control). FIGS. 8 and 9 show an example of the leapfrog action. As described above, the player object 201 automatically moves, but in this case, a situation in which the enemy object 205 is present in the advancing direction of the player object 201 as shown in FIG. 8 (a situation in which the enemy object 205 approaching from the advancing direction) is assumed. In such a case, if the player does not perform any operation, when the player object 201 comes close to the front of the enemy object 205, an action (of automatic avoidance) in which the player object 201 automatically "leapfrogs" the enemy object 205 to avoid a collision with the enemy object 205 as shown in FIG. 9 is performed (in this case, the enemy object 205 is not damaged).

In addition, as execution conditions for the above leapfrog action, determinations are performed as to the following conditions. That is, determinations are performed as to a condition regarding the moving speed of the player object, a condition regarding the positional relationship between the player object and a terrain object, a condition regarding the positional relationship between the enemy object and the terrain object, and a condition regarding the positional relationship between the player object and the enemy object. Specifically, determinations are performed as to the following conditions.

(1) The moving speed of the player is equal to or higher than a certain value.

(2) The player object 201 is not away from the ground.

(3) No obstacle is present above the player object 201 and the enemy object 205.

(4) The difference in height between the player object 201 and the enemy object 205 is within a predetermined range.

The first condition is set in order that if the moving speed of the player object 201 is low, the approach run is considered as being insufficient for leapfrog, and a leapfrog action is not performed. The second condition is set since the player object 201 needs to be on the ground for leapfrog, and the third condition is set since there is no space for leapfrog if such an obstacle is present. The fourth condition is set in order that, in principle, a leapfrog action is not performed if the distance in the height direction to the enemy object 205 is excessively large (if a height relationship in which the player object 201 can leapfrog the enemy object 205 is not established, for example, if the enemy object 205 is present above a step). However, this does not apply to the case where the player object 201 or the enemy object 205 is located on a specific terrain, specifically on an upslope or a downslope even when the distance in the height direction to the enemy object 205 is excessively large, and a leapfrog action is performed exceptionally in such a case.

Figure 10:
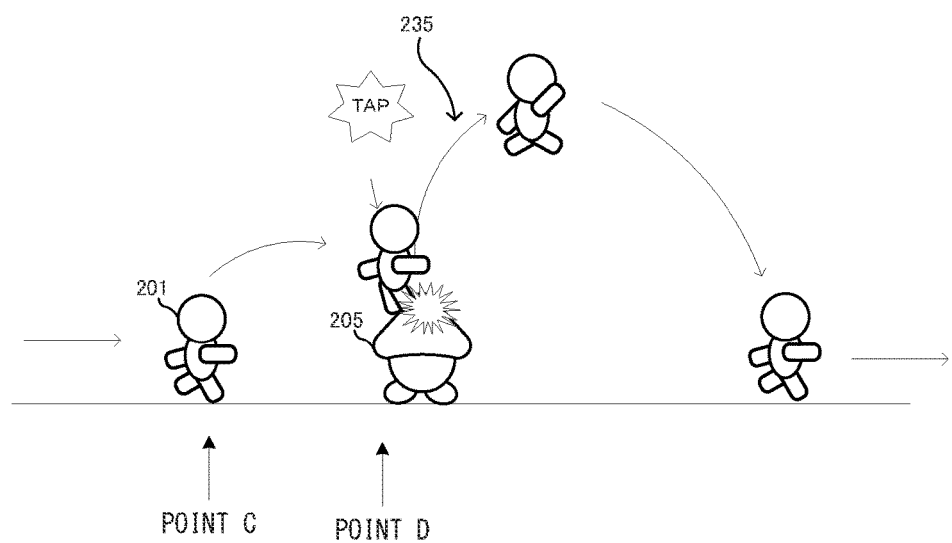
FIG. 10 is a diagram for explaining the automatic avoidance action.

Here, by performing a tap operation during the above "leapfrog action" (while a motion of leapfrog is displayed), the player can cause the player object 201 to perform a trample attack on the enemy object 205. FIG. 10 shows an example of such an action. It is assumed that the player object 201 starts a leapfrog action at a point C, and then, during the motion of the leapfrog action, the player performs a tap operation at a point D. In this case, the motion of the leapfrog action is cancelled and is switched to a motion of trampling the enemy object 205. Then, after the trample, the player object 201 performs a jump action with the enemy object 205 as a base. In addition, in this case, regarding the player object 201, an action in which the player object 201 jumps while laterally rolling is performed.

Meanwhile, in the present embodiment, types of jumps include four types, that is, a jump through a tap operation during running on the ground (e.g., the trajectory 230 in FIG. 3), a jump in reaction to trampling of the enemy in fall after a jump (e.g., the trajectory 231 in FIG. 3), a jump after a trample attack through a tap operation when the player object 201 is in the air (a trajectory 233 in FIG. 7), and a jump after trample through a tap operation during a leapfrog action (e.g., a trajectory 235 in FIG. 10). In the present embodiment, among the cases of these jumps, there is no difference in the trajectory and the basic height of the jump. In addition, in each of these cases, the height of the jump can be changed in accordance with the duration of the tap operation. On the other hand, regarding an action during a jump, for example, an action during a jump after a trample attack through a tap operation when the player object 201 is in the air is different from actions during other jumps. As described above, in the present embodiment, the trajectories and the heights of the jumps are the same, but the actions performed by the player object 201 at these times are different from each other. That is, as movement control, different movement control processes are performed.

However, in another embodiment, the trajectories of the above various jumps may be different from each other. In addition, reversely, as the actions during the above various jumps, the same action (the same movement control) may be performed.

As described above, in this game, the player object 201 can be caused to perform various actions against the enemy object 205 while simple operability in which an operation that can be performed by the player for the player object 201 is only a tap operation (jump operation) is provided.

Figure 11:
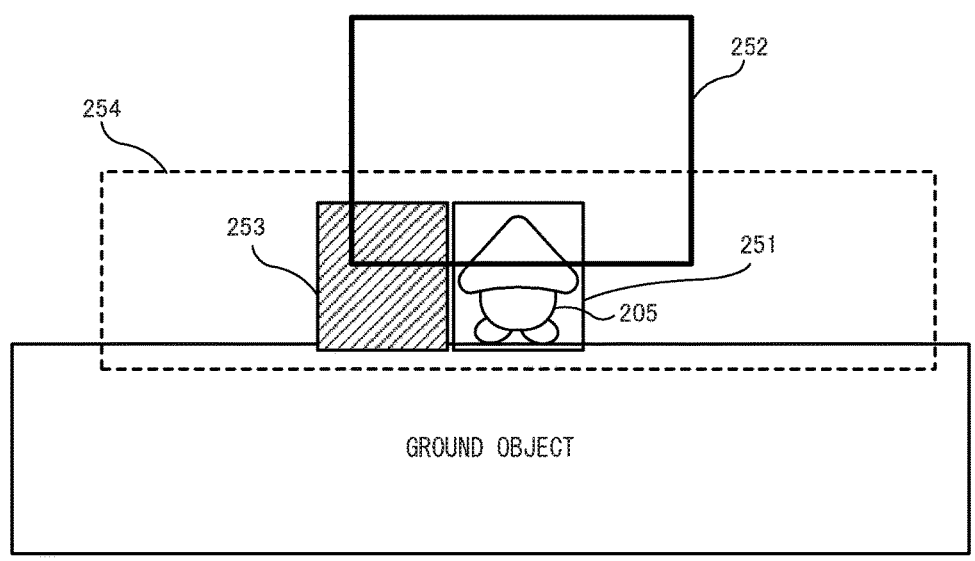
FIG. 11 is a diagram for explaining determination regions in the embodiment.

In order to easily achieve various actions while providing simple operability with only a tap operation as described above, processing described below is performed in the present embodiment. First, the principle of the processing performed in the present embodiment will be described. In the present embodiment, a plurality of regions to be used for a determination as to a collision with the player object 201 are set for each enemy object. In other words, a plurality of determination necessity regions are set for one enemy object so as to be associated therewith. FIG. 11 shows an example of the configuration of such regions in the present embodiment. FIG. 11 shows a first determination region 251 that is set so as to overlap the enemy object 205, a second determination region 252 (shown by a thick line frame) that is located so as to extend across the upper portion of the first determination region 251, a third determination region 253 (shown by an oblique line pattern) that is located adjacent to the left side of the first determination region 251, and a fourth determination region 254 (shown by a broken line frame) that has a horizontally long rectangular shape and extends so as to include the first and third determination regions. Hereinafter, each determination region will be described.

First, the first determination region 251 will be described. The first determination region 251 is a rectangular region having substantially the same size as the enemy object 205, and is set so as to overlap the enemy object 205. This region is used for a determination as to whether the player object 201 is in contact with the enemy object 205. In other words, this region is used for a determination as to whether the player object 201 tramples the enemy object 205 (by a fall movement in a jump) without performing a tap operation, a determination as to whether the player object 201 is damaged by contact with an enemy object, etc. Thus, the size or the shape of the first determination region 251 can be changed in accordance with the shape or the size of the enemy object 205. For example, for an enemy object having a horizontally long shape, the first determination region 251 is a region having a horizontally long rectangular shape. When at least a part of the player object 201 is located within the first determination region 251, it is determined that the player object 201 is in contact (collides) with the enemy object 205 associated with the first determination region 251.

Next, the second determination region 252 will be described. In FIG. 11, the position of the second determination region 252 is set to a position including a region shifted in a direction orthogonal to the advancing direction. Specifically, the second determination region 252 is set so as to include an upper region of the enemy object 205 (the first determination region 251). Regarding the size of the second determination region 252, the second determination region 252 is set so as to be wider in the advancing direction and the direction orthogonal to the advancing direction than the first determination region 251 (the enemy object 205). A specific size of the second determination region 252 only needs to be set as appropriate in accordance with the shape or the size of the enemy object 205 (in other words, the vertical and horizontal lengths may be changed to some extent). However, basically, the second determination region 252 is set as a region larger than the enemy object 205 (the first determination region 251). In addition, regarding the horizontal direction, the second determination region 252 is set at a position at which the second determination region 252 is laterally symmetrical about the enemy object 205. Moreover, the second determination region 252 is located such that the lower side of the second determination region 252 partially overlaps the enemy object 205 and the first determination region 251. Furthermore, the second determination region 252 is located so as to partially overlap the later-described third determination region 253.

The second determination region 252 is a region to be used for a determination as to occurrence of a trample attack through a tap operation as described above with reference to FIGS. 6 and 7. When a tap operation is detected while the player object 201 is located within the second determination region 25, whether a predetermined relationship is satisfied is determined for each of a condition regarding the moving direction of the player object and a condition regarding the positional relationship between the enemy object and the terrain object. Specifically, if the following conditions are satisfied:

the player object 201 is falling (the moving direction is a downward direction); and no obstacle (terrain object) is present above the enemy object 205, even when the player object 201 is not in contact with the enemy object 205 (the first determination region 251), a trample attack process on the enemy object 205 associated with the second determination region 252 is performed. In this configuration, a tap operation in such a state is inferred to have, as a player's intention, an intention to jump (attack) with the enemy object as a foothold, and is handled with the player object 201 being considered landing on and trampling the enemy object 205, although the player object 201 strictly does not land on the enemy object 205. Thus, the player object 201 can be easily caused to perform various actions.

Figure 12:
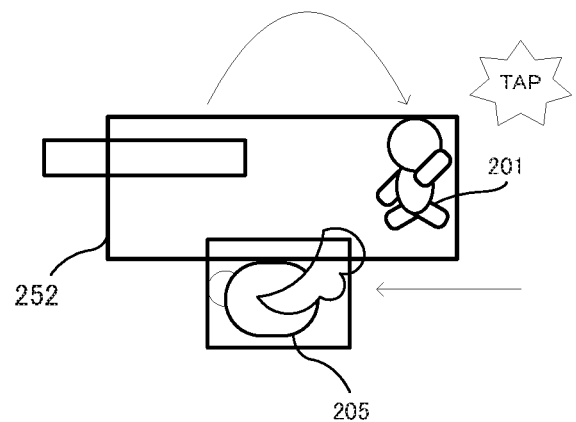
FIG. 12 is a diagram for explaining a determination process using a second determination region.
Figure 13:
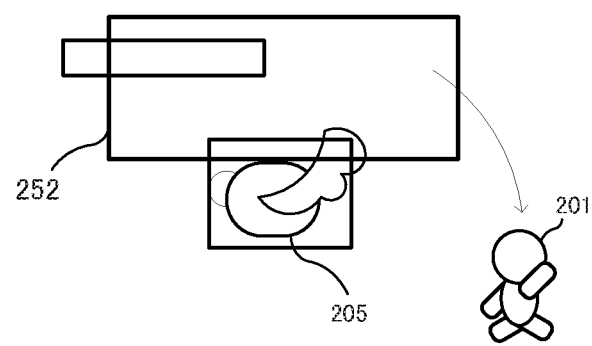
FIG. 13 is a diagram for explaining the determination process using the second determination region.

However, as an exceptional process, in the case of a situation described below, such an attack process is not performed. That is, even when a tap operation is performed in a positional relationship in which the player object 201 has jumped over the enemy object 205 as shown in FIG. 12, a trample attack on the enemy object 205 is not performed. That is, when the player object 201 is located at the side in the (forced) advancing direction of the player object 201 with respect to the position of the enemy object 205, a trample attack on the enemy object 205 is not performed. In this case, even when a tap operation is performed, nothing particularly occurs, and the player object 201 falls as it is (FIG. 13). This is based on the standpoint that the degree of unnaturalness becomes rather high if the player object 201 attacks the enemy object 205 even in a state where the player object 201 has jumped over the enemy object 205. In another embodiment, importance is placed on operability of the player, and even such a case may be handled with a trample attack being considered to be performed, similarly to the above.

Figure 14:
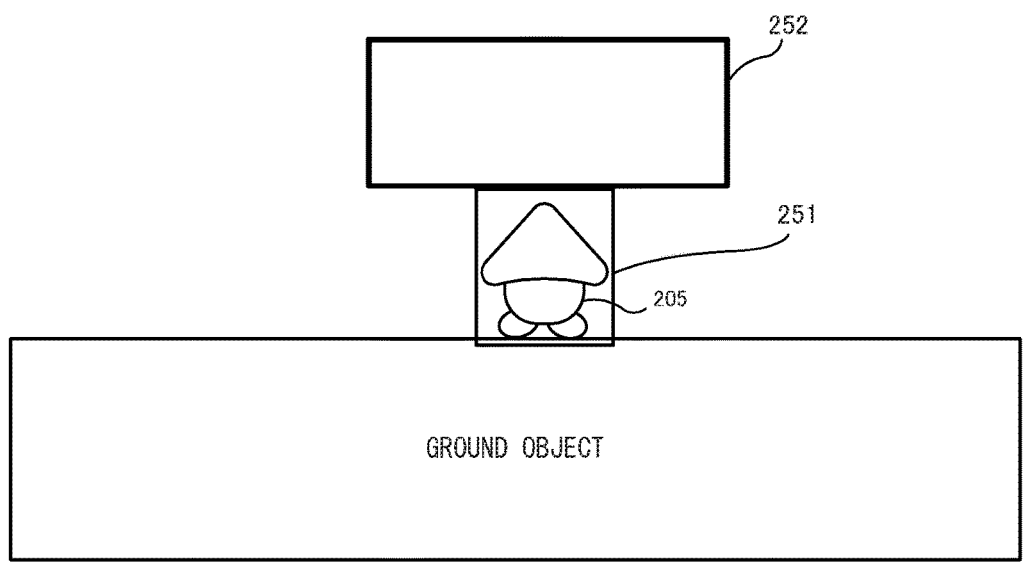
FIG. 14 is a diagram showing a non-limiting example of the configuration of the second determination region.

In addition, in FIG. 11, the second determination region 252 is located such that the lower side of the second determination region 252 partially overlaps the enemy object 205. This is because an operation reflecting player's intention is more easily caused to occur, by expanding a range in which a tap operation of the player is detected. Thus, in another embodiment, for example, as shown in FIG. 14, the second determination region 252 may be located at a position at which the second determination region 252 does not overlap the enemy object 205, specifically, at a position adjacent to the enemy object 205.

The size of the second determination region 252 shown in FIG. 11 is an example, and the size of the second determination region 252 may be made larger or smaller than that shown in FIG. 11 in accordance with the contents of the game or the like. This game is a game in which the player object 201 automatically moves and the screen also automatically scrolls as described above. Thus, in principle, it is not possible to "return and try again", for example, it is not possible to take the position of the player object 201 slightly backward and cause the player object 201 to jump again. Thus, regarding a determination as to a collision with the enemy object 205, only with a process using only the first determination region (as in the conventional art), the level of difficulty of the game becomes excessively high. In this respect, in the present embodiment, by setting the size of the second determination region 252 as appropriate, it is possible to design a level of difficulty that allows a wide variety of players having different skill levels to comfortably play the game. For example, when the second determination region 252 is set larger, movement control reflecting the intention of a tap operation of the player is more easily performed, so that comfortable game play can be provided to a player having a low skill level.

Figure 15:
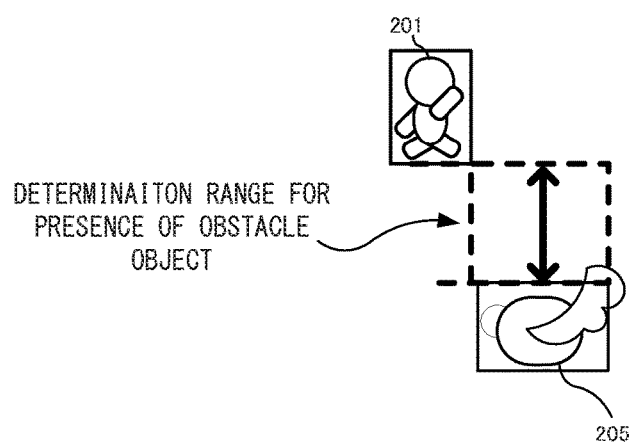
FIG. 15 is a diagram for explaining an obstacle determination range.

Regarding the condition that no obstacle is present above the enemy object 205, more specifically, the determination as to this condition is performed on the basis of whether an object to be an obstacle is present within a range from the lower end of the player object 201 to the upper end of the enemy object 205 as shown in FIG. 15.

In addition, when a tap operation is detected in a state where the player object 201 is located within the second determination regions 252 of a plurality of enemy objects 205, a trample attack process is performed only on the enemy object 205 for which the above determination is performed earliest.

Next, the third determination region 253 and the fourth determination region 254 will be described. These determination regions are used for a determination as to whether to perform the above-described leapfrog action. First, the third determination region 253 will be described. Regarding the third determination region 253, when the player object 201 is located within the third determination region 253 and a tap operation has not been detected, the player object 201 is caused to perform the above leapfrog action. Regarding the position of the third determination region 253, the third determination region 253 is set so as to be adjacent to the first determination region 251 (the enemy object 205). In FIG. 11, the third determination region 253 is located immediately at the left side of the first determination region 251. This is because the player object 201 moves rightward. In other words, the third determination region 253 is located at the side to which the player object 201 comes close as seen from the enemy object 205. In addition, regarding the size of the third determination region 253, in the present embodiment, the third determination region 253 has, as a basic size, a size slightly smaller than the first determination region 251, and the horizontal size thereof is variable in accordance with the moving speed of the player object 201. This is because the start position of the leapfrog action also changes in accordance with the moving speed of the player object 201. For example, as the moving speed increases, the leapfrog action is caused to be started at a nearer position as seen from the player object 201. In order to achieve such a motion, the horizontal length of the third determination region 253 is set so as to be larger than the basic size as the moving speed of the player object 201 increases. Regarding the vertical size of the third determination region 253, the third determination region 253 has a height that is substantially equal to that of the enemy object 205 (the first determination region 251).

Next, the fourth determination region 254 will be described. The fourth determination region 254 is a region to be used for determining whether to perform the determination process using the above-described third determination region 253. That is, the determination process using the above-described third determination region 253 is performed only when the player object 201 is located within the fourth determination region 254. In FIG. 11, the fourth determination region 254 includes the first determination region 251 and the third determination region 253. The shape of the fourth determination region 254 is a horizontally long rectangle. Since the start position of the leapfrog action is changed on the basis of the moving speed of the player object 201 as described above, the fourth determination region 254 is configured to include at least a region at the near side from the third determination region 253 in the advancing direction of the player object 201. In addition, unlike the third determination region 253 whose size is variable, the size of the fourth determination region 254 is fixedly set. Thus, the fourth determination region 254 has a size that allows the entirety of the third determination region 253 to be included therein even when the size of the third determination region 253 is changed. In the example of FIG. 11, the fourth determination region 254 is shaped and located so as to be laterally symmetrical about the first determination region 251.

As described above, through a tap operation during a leapfrog action, the leapfrog action can be cancelled and a trample attack can be performed. In this case, as the positional relationship, a relationship in which the player object 201 is located within the second determination region 252 is established. However, when a trample attack is performed in the middle of the leapfrog action as described above, a determination using the above-described first determination region 251 and a determination process using the above-described second determination region 252 are not performed. That is, a determination as to whether the player object 201 is located within the first determination region 251 and a determination as to whether the player object 201 is within the second determination region 252 are not performed. In other words, during a leapfrog action, determination processes using the first determination region 251 and the second determination region 252 are not performed. This is for avoiding overlap of determination processes and reducing the processing load.

As described above, in the present embodiment, a plurality of regions to be used for a collision determination are set for one enemy object 205. By combining such a plurality of determination regions, various types of movement control accompanying a collision between the player object 201 and the enemy object 205 can be achieved while simple operability with only a tap operation is provided to the player.

Next, the game processing in the present embodiment will be described in detail with reference to FIGS. 16 to 19.

Figure 16:
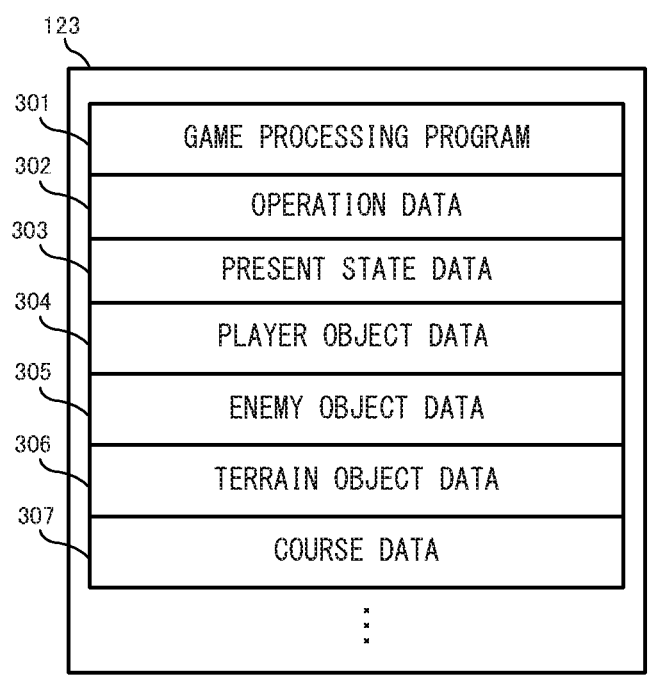
FIG. 16 is a diagram showing a non-limiting example of a program and information stored in a main memory 113 of the smart device 102.

FIG. 16 shows an example of a program and information stored in the main memory 113 of the smart device 102. In the main memory 113, a game processing program 301, operation data 302, present state data 303, player object data 304, enemy object data 305, terrain object data 306, course data 307, and the like are stored.

The game processing program 301 is a program for performing the game processing as described above.

The operation data 302 is data indicating various operations performed on the smart device 102. In the present embodiment, the operation data 302 includes button data and touch panel data. These data are data indicating the contents of operations performed on the operation section 115, and are data indicating pressed states of various buttons, a touch coordinate of a touch panel, touch duration, and the like.

The present state data 303 is data for indicating the present state of the player object 201 during the game. Specifically, the present state data 303 is data indicating in which of the following states the player object 201 is. The states indicated by this data include at least four states, that is, (a) a state where the player object 201 is automatically moving (a normal moving state), (b) during execution of a leapfrog action, (c) during a jump, and (d) during execution of a trample attack. As an initial value, the "normal moving state" is set. The content of the present state data 303 is updated as appropriate in accordance with the situation of the game (e.g., every frame period).

The player object data 304 is data for displaying the player object 201. The player object data 304 includes, for example, motion data that defines the contents of motions corresponding to the various actions descried above.

The enemy object data 305 is data that defines (a plurality of types of) enemy objects. The enemy object data 305 includes, for each enemy object, data indicating the appearance of the enemy object, information indicating the contents of movement (the manner of behavior) of the enemy object, and information that defines the first determination region 251, the second determination region 252, the third determination region 253, and the fourth determination region 254 described above, and the like.

The terrain object data 306 is data regarding various terrain objects forming a game course. The terrain object data 306 includes data indicating the appearance of the various terrain objects, and the like.

The course data 307 is data that defines the contents of the game course. The course data 307 includes information indicating the terrain of the course, information indicating the arrangement of coin objects and enemy objects, and the like. The game course is generated within the virtual game space on the basis of this data.

In addition to the above, in the main memory 113, various data to be used in the game processing, such as an advancing direction parameter indicating the moving direction (advancing direction) of the player object 201, a moving speed parameter indicating the moving speed of the player object 201, and a jump distance parameter indicating a flight distance when the player object 201 jumps as described above, are also stored as appropriate.

Next, flow of game processing performed by the processor section 111 of the smart device 102 will be described with reference to flowcharts of FIGS. 17 to 19. Here, only processing using the above-described four determination regions will be described, and the description of other game processing is omitted.

Figure 17:
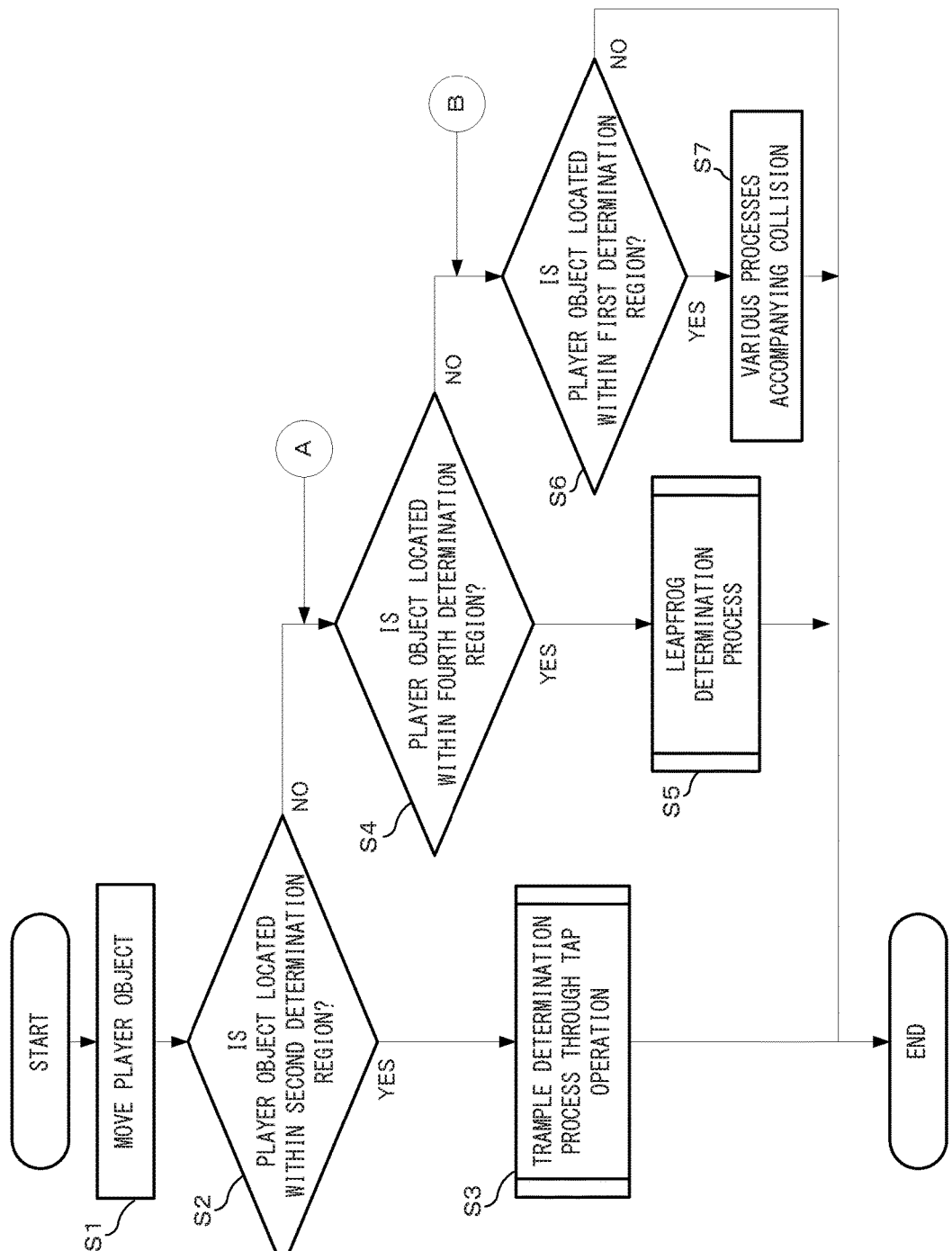
FIG. 17 is a flowchart showing game processing in the embodiment.

FIG. 17 is a flowchart showing the details of the processing using the above-described four determination regions. This processing is repeatedly performed, for example, every frame period. In addition, before start of the processing, a process of setting the above-described various determination regions on the basis of the enemy object data 305 is completed.

In FIG. 17, first, in step S1, the processor section 111 performs a movement process for the player object 201. That is, a process of automatically moving the player object 201 in accordance with the advancing direction parameter and the moving speed parameter at this time is performed.

Subsequently, in step S2, the processor section 111 determines whether the player object 201 is located within the second determination region 252 associated with any enemy object 205. As a result of the determination, when the player object 201 is located within the second determination region 252 of any enemy object 205 (YES in step S2), the processor section 111 performs a trample determination process through a tap operation in step S3. In the following description, the enemy object 205 associated with the second determination region 252 within which the player object 201 is located is referred to as "determination target enemy object".

Figure 18:
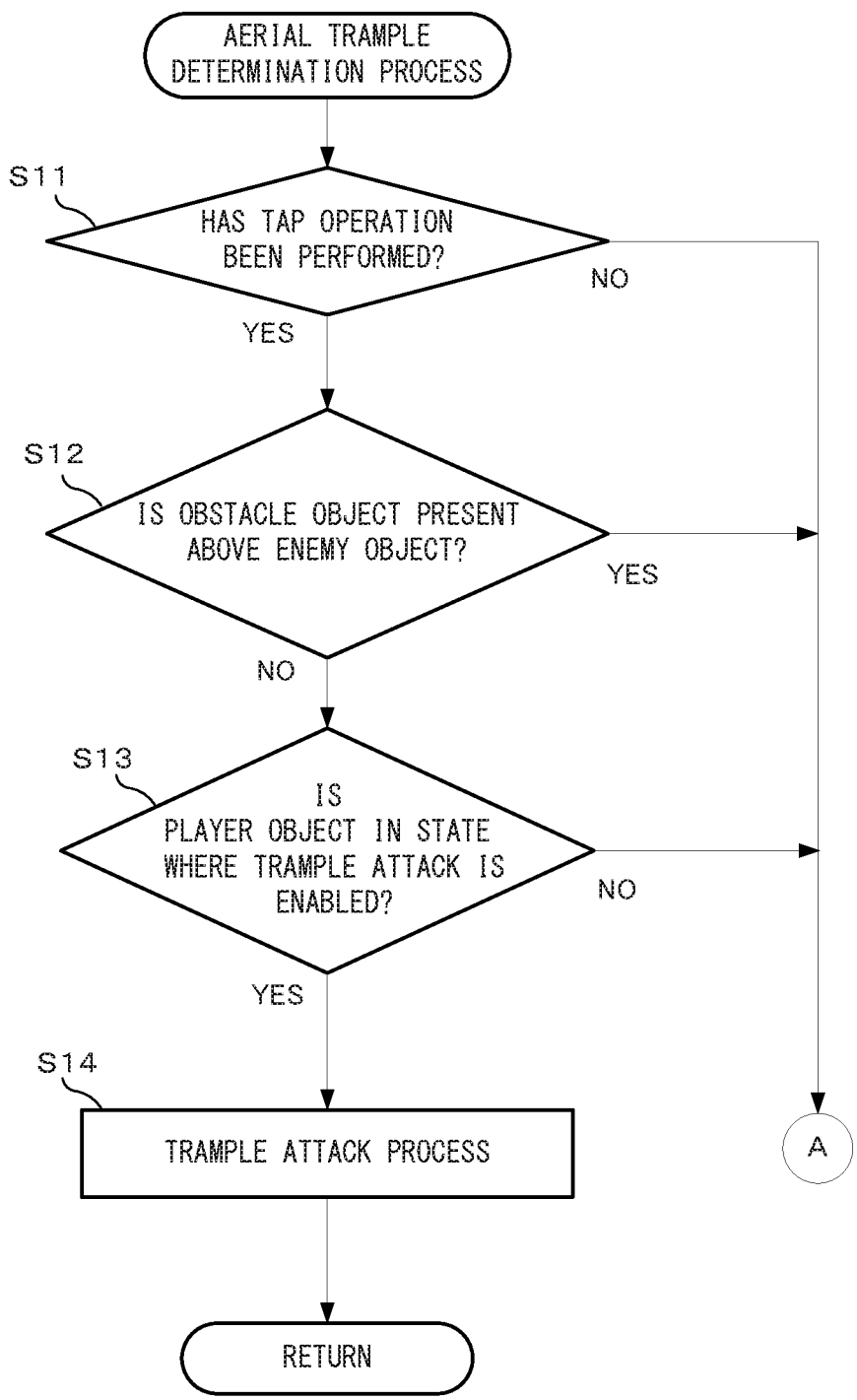
FIG. 18 is a flowchart showing the details of a trample determination process through a tap operation.

FIG. 18 is a flowchart showing the details of the trample determination process through a tap operation in step S3 described above. First, in step S11, the processor section 111 refers to the operation data 302 and determines whether a tap operation has been performed. When a tap operation has not been performed (NO in step S11), the processing proceeds to step S4 described later. On the other hand, when a tap operation has been performed (YES in step S11), the processor section 111 determines subsequently in step S12 whether any obstacle object is present above the determination target enemy object. As a result, when some sort of an obstacle object is present (YES in step S12), the processing proceeds to step S4 described later.

On the other hand, when no obstacle object is present (NO in step S12), the processor section 111, subsequently in step S13, refers to the present state data 303 and determines whether the present state of the player object 201 is a state where a trample attack on the enemy object 205 is enabled. Specifically, the processor section 111 determines whether the player object 201 is in a state of being in the air (not in contact with the ground) and in a state of falling (not in a state of rising). That is, the processor section 111 determines whether the moving direction of the player object 201 is a downward direction. In addition, when these conditions are satisfied, the processor section 111 further determines whether the positional relationship between the player object 201 and the determination target enemy object 205 is the positional relationship as shown in FIG. 12, that is, whether the player object 201 is located at the side in the advancing direction with respect to the determination target enemy object 205. When the player object 201 is located in the advancing direction with respect to the determination target enemy object 205, it is determined that the present state is the state where a trample attack is enabled.

As a result of the determination, when the present state is not the state where a trample attack is enabled (NO in step S13), the processing proceeds to step S4 described later. On the other hand, when the present state is the state where a trample attack is enabled (YES in step S13), the processor section 111 performs a trample attack process in step S14. That is, the processor section 111 causes the player object 201 to make a jump movement, regardless of whether the player object 201 is actually in contact with the upper portion of the enemy object 205. Furthermore, the processor section 111 starts displaying a motion indicating a state where the determination target enemy object is eliminated (note that, depending on the type of the enemy object, if a cumulative damage value is equal to or less than a predetermined value, the processor section 111 merely adds a predetermined damage value, and does not start displaying the motion in which the determination target enemy object is eliminated). Then, the trample determination process through a tap operation ends.

Referring back to FIG. 17, as a result of the determination in step S2 described above, when the player object 201 is not located within the second determination region 252 associated with any enemy object 205 (NO in step S2), the processor section 111 determines subsequently in step S4 whether the player object 201 is located within the fourth determination region 254 associated with any enemy object 205. As a result, when the player object 201 is located within the fourth determination region 254 associated with any enemy object 205 (YES in step S4), the processor section 111 performs a leapfrog determination process in step S5.

Figure 19:
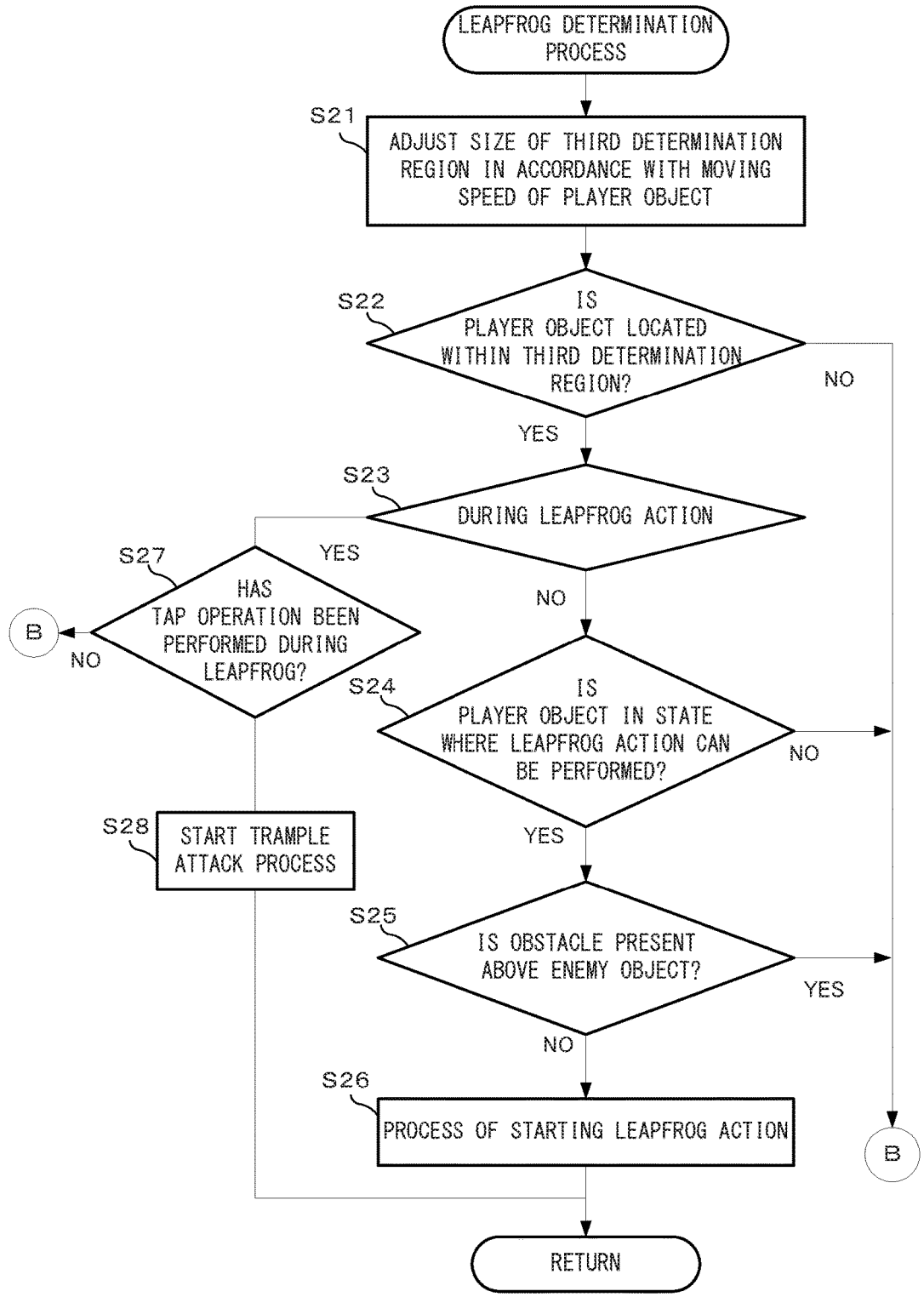
FIG. 19 is a flowchart showing the details of a leapfrog determination process.

FIG. 19 is a flowchart showing the details of the leapfrog determination process in step S5 described above. In FIG. 19, first, in step S21, the processor section 111 performs a process of adjusting the size (the horizontal length) of the third determination region 253 in accordance with the moving speed of the player object 201.

Subsequently, in step S22, the processor section 111 determines whether the player object 201 is located within the third determination region 253. As a result, when the player object 201 is not located within the third determination region 253 (NO in step S22), the processing proceeds to step S6 described later.

On the other hand, when the player object 201 is located within the third determination region 253 (YES in step S22), the processor section 111, in step S23, refers to the present state data 303 and determines whether the present state of the player object 201 is during a leapfrog action as described above. As a result, when the present state is during a leapfrog action (YES in step S23), the processor section 111 determines in step S27 whether a tap operation has been performed during the leapfrog action. That is, the processor section 111 determines whether the present situation is the situation as described above with reference to FIG. 10. As a result, when a tap operation has not been performed (NO in step S27), the processing proceeds to step S6 described later. When a tap operation has been performed (YES in step S27), the processor section 111 starts performing a trample attack process on the determination target enemy object, without performing a determination as to a collision with the determination target enemy object, in step S28. That is, for example, a process of updating the present state data 303 with a content indicating that a trample attack is being performed, or a process of changing the display form of the determination target enemy object so as to show a motion in which the determination target enemy object is eliminated, is performed.

On the other hand, as a result of the determination in step S23, when the present state is not during a leapfrog action (NO in step S23), the processor section 111 determines subsequently in step S24 whether the player object 201 is in a state where the player object 201 can perform a leapfrog action. For example, when the player object 201 is in a state during a trample attack performed by performing a tap operation during a leapfrog action as described above, it is determined that the present state is not the state where the player object 201 can perform a leapfrog action. In addition, a determination as to the condition regarding the moving speed of the player object 201 is performed, and also when the moving speed is equal to or less than a predetermined value, it is determined that the present state is not the state where the player object 201 can perform a leapfrog action. In addition, a determination as to the condition regarding the positional relationship between the player object 201 and the enemy object 205 is performed. Specifically, also when the distance in the height direction between the player object 201 and the enemy object 205 is excessively large, it is determined that the present state is not the state where the player object 201 can perform a leapfrog action (note that, as described above, when the player object 201 and the enemy object 205 are located on an upslope or a downslope, it is determined that the present state is the state where the player object 201 can perform a leapfrog action). As a result of such determination in step S24, when the player object 201 is not in the state where the player object 201 can perform a leapfrog action (NO in step S24), the processing proceeds to step S6 described later.

On the other hand, when the player object 201 is in the state where the player object 201 can perform a leapfrog action (YES in step S24), the processor section 111 determines subsequently in step S25 whether any obstacle object is present above the determination target enemy object. As a result, when some sort of an obstacle object is present (YES in step S25), the processing proceeds to step S6 described later. On the other hand, when no obstacle object is present (NO in step S25), the processor section 111 performs a process of starting a motion of a leapfrog action of the player object 201 in step S26. Regarding the leapfrog motion, a plurality of types of motions may be prepared in advance, and one motion may be randomly selected from among the plurality of types of motions. In addition, at this time, in order to prevent the same motion from being selected successively, control may be performed such that the motion that is selected last is not selected. This is the end of the leapfrog determination process.

Referring back to FIG. 17, as a result of the determination in step S4 described above, when the player object 201 is not located within the fourth determination region 254 associated with any enemy object 205 (NO in step S4), the processor section 111 determines subsequently in step S6 whether the player object 201 is located within the first determination region 251 associated with any enemy object 205. As a result, when the player object 201 is located within the first determination region 251 associated with any enemy object 205 (YES in step S6), the processor section 111 performs, as appropriate, various processes accompanying a collision between the enemy object 205 and the player object 201, in step S7. For example, the processor section 111 determines the entry angle and the entry direction of the player object 201 into the first determination region 251, and when the player object 201 has entered the first determination region 251 through a trajectory from up to down (fall by a jump corresponds to this), the processor section 111 performs a process of trampling the enemy object 205. In addition, reversely to the above, when the player object 201 has entered the first determination region 251 through a trajectory from down to up, the processor section 111 performs a process of adding a damage value to the player object 201, etc.

On the other hand, as a result of the determination in step S6, when the player object 201 is not located within the first determination region 251 associated with any enemy object 205 (NO in step S6), the game processing using the above-described four determination regions ends. Although not shown, other game processing, such as a rendering process or the like, is performed as appropriate.

As described above, in the present embodiment, a plurality of regions to be used for a collision determination are set for each enemy object 205, and different types of movement control are performed in accordance with the results of the determinations for the respective regions. By combining such a plurality of regions for a collision determination, simple operability with only a tap operation is provided to the player, and also various types of movement control of the player object accompanying a collision can be achieved. In the case of the above example, execution of various actions, such as a trample attack by fall in a jump movement, a trample attack through a tap operation under a predetermined condition, and a leapfrog action for avoiding a collision, can be provided to the player with simple operability.

The sizes and the shapes of the determination regions described above are not limited to the above-described sizes and shapes. For example, the shape of each of the determination regions may be a circular or elliptical shape. In addition, the second determination region 252 and the fourth determination region 254 are located and sized so as to be laterally symmetrical about the first determination region 251 in the above example, but the positions and the sizes thereof are not limited thereto, and each of the second determination region 252 and the fourth determination region 254 may be shaped and sized such that the length at the side to which the player object 201 comes close as seen from the enemy object 205 is longer, and the length at the opposite side is shorter. In addition, as the third determination region 253, a region that is set at a position adjacent to the first determination region 251 (the enemy object 205) is exemplified, but the third determination region 253 is not limited to the region "adjacent to" the first determination region 251, and may be located, for example, so as to partially overlap the first determination region 251.

In the above example, the case where the player object 201 forcedly moves rightward on the screen has been described as an example. In addition to this, the above processing is also applicable to, for example, the case with a game stage configuration in which the automatic moving direction of the player object 201 is switched between right and left. For example, this case is a case with a vertically long game stage configuration in which the screen is not horizontally scrolled, and the advancing direction of the player object 201 is switched to the opposite direction when the player object 201 reaches any of the right and left edges of the screen. In this case, regarding the settings of the above-described third determination region 253, the position of the third determination region 253 only needs to be changed as appropriate such that the third determination region 253 is located at the right side or the left side of the enemy object 205 in accordance with the advancing direction of the player object 201. In addition, in such a case, the second determination region 252 and the fourth determination region 254 are advantageous from the standpoint of processing load reduction, when being shaped so as to be laterally symmetrical about the enemy object 205.

Moreover, the example in which the processing using a plurality of collision determination-related regions for one object is applied to the forced horizontal scroll-type jumping action game, has been described above. However, in addition to the jumping action game, the processing is also applicable to, for example, a game in which a virtual space is a three-dimensional space (e.g., a game in which a forced moving direction is the depth direction, etc.). In addition, the above processing may be applied to, for example, an application which has no game factor and in which a player object can freely move around in a virtual reality space.

In the embodiment described above, the series of processes of the game processing as described above is performed in a single device (smart device). In another embodiment, the series of processes described above may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, as a computer-readable storage medium having stored therein a game program with which the game processing according to the embodiment described above can be achieved, the processing according to the present embodiment may be provided. For example, the processing according to the present embodiment may be provided by a magnetic medium such as a flash memory, a ROM, or a RAM, or an optical medium such as a CD-ROM, a DVD-ROM, or a DVD-RAM. Regarding the processes in the respective steps in the above-described flowcharts, the order of the processes can be changed.

What is claimed is:

1. A game system comprising:
a touch screen;
a processing system having at least a processor and a memory that is configured to store computer readable instructions that, when executed by the processor, cause the game system to:
automatically move an operation target object that is an operation target of a player in a predetermined direction within a virtual space;
display, on the touch screen, a game screen that scrolls so as to follow movement of the operation target object;
perform predetermined movement control on the operation target object on the basis of a touch input from the player on the touch screen;
when the operation target object is located within a first determination region set for a non-operation target object, which is an object different from the operation target object, so as to be located at a position overlapping the non-operation target object, perform first collision determination processing that includes determining that the operation target object has collided with the non-operation target object, changing a display form of the non-operation target object to a first display form, and performing first movement control on the operation target object;
when a touch input is performed in a state where the operation target object is located within a second determination region set for the non-operation target object so as to be wider in the predetermined direction and a direction orthogonal to the predetermined direction than the first determination region, perform second collision determination processing that includes determining that the operation target object has collided with the non-operation target object, changing the display form of the non-operation target object to the first display form, and performing second movement control, which is different from the first movement control, on the operation target object; and
when the operation target object is located within a third determination region set for the non-operation target object so as to be located at a side in a direction opposite to the predetermined direction with respect to a position of the first determination region and at a position adjacent to the first determination region, perform third collision determination processing that includes performing third movement control, which is different from the first movement control and the second movement control, on the operation target object such that the operation target object avoids a collision with the non-operation target object, wherein when a touch input is performed while the third movement control is performed, the third collision determination processing further includes changing the display form of the non-operation target object to the first display form without performing the process by the first collision determination processing and the process by the second collision determination processing.

2. The game system according to claim 1, wherein when a touch input is performed while the third movement control is performed, the third collision determination processing further includes changing the display form of the non-operation target object to the first display form and performing fourth movement control, which is different form the third movement control, on the operation target object.

3. The game system according to claim 1, wherein a position and a size of the second determination region are set such that the second determination region partially overlaps the first determination region and the third determination region.

4. The game system according to claim 1, wherein the game system is further caused to perform fourth collision determination processing for determining whether the operation target object is located within a fourth determination region that is a region set for the non-operation target object and includes the third determination region, wherein
the third collision determination processing is performed only when the operation target object is located within the fourth determination region.

5. The game system according to claim 4, wherein the fourth determination region is set so as to include entireties of the first determination region and the third determination region and so as to include at least a region at the side in the direction opposite to the predetermined direction with respect to a position of the third determination region.

6. The game system according to claim 4, wherein the game system is further caused to perform determination region setting for setting the third determination region with a size different in accordance with a moving speed of the operation target object and setting the fourth determination region with a fixed size regardless of the moving speed of the operation target object.

7. The game system according to claim 1, wherein as a result of the determination as to whether the operation target object is located within the second determination region, when it is determined that the operation target object is not located within the second determination region, the game system is further caused to determine whether the operation target object is located within the third determination region, and when it is determined that the operation target object is not located within the third determination region, the game system is further caused to perform the process by the first collision determination processing.

8. The game system according to claim 1, wherein
the second collision determination processing includes a moving direction condition determination for further determining whether a predetermined condition regarding a moving direction of the operation target object is satisfied, after it is determined that the operation target object is located within the second determination region, and when it is determined that the predetermined condition regarding the moving direction of the operation target object is satisfied, a process of changing the display form of the non-operation target object and movement control on the operation target object are performed.

9. The game system according to claim 1, wherein
the second collision determination processing includes a first positional relationship condition determination for further determining whether a predetermined condition regarding a positional relationship between the operation target object and the non-operation target object is satisfied, after it is determined that the operation target object is located within the second determination region, and when it is determined that the predetermined condition regarding the positional relationship is satisfied, a process of changing the display form of the non-operation target object and movement control on the operation target object are performed.

10. The game system according to claim 1, wherein
the third collision determination processing includes a moving speed condition determination for further determining whether a predetermined condition regarding a moving speed of the operation target object is satisfied, when it is determined that the operation target object is located within the third determination region, and when it is determined that the predetermined condition regarding the moving speed is satisfied, a process of the third movement control is performed.

11. The game system according to claim 1, wherein
the third collision determination processing includes a second positional relationship condition determination for further determining whether a predetermined condition regarding a positional relationship between the operation target object and the non-operation target object, after it is determined that the operation target object is located within the third determination region, and when it is determined by the second positional relationship condition determination that the predetermined condition regarding the positional relationship is satisfied, a process of the third movement control is performed.

12. The game system according to claim 11, wherein even when it is determined that the predetermined condition regarding the positional relationship is not satisfied, if the operation target object is located on a predetermined terrain object that is defined in advance, the second positional relationship condition determination determines that the predetermined condition regarding the positional relationship is satisfied.

13. The game system according to claim 1, wherein the game system is further caused to perform speed reduction for reducing a moving speed of the operation target object in accordance with a touch position being continuously changed toward the direction opposite to the predetermined direction after the touch input is performed.

14. The game system according to claim 1, wherein the first determination region is used to determine whether the operation target object makes contact with the non-operation target object without performing a tap operation on the touch screen.

15. The game system according to claim 1, wherein the second determination region is used to determine whether the operation target object makes contact with the non-operation target object through a tap operation on the touch screen.

16. The game system according to claim 1, wherein the third determination region is used to determine whether to perform a jumping action in association with the operation target object and the non-operation target object.

17. A game processing method for controlling a computer of a game system including a touch screen, the game processing method comprising:
   automatically moving an operation target object that is an operation target of a player in a predetermined direction within a virtual space;
   displaying, on the touch screen, a game screen that scrolls so as to follow movement of the operation target object;
   performing predetermined movement control on the operation target object on the basis of a touch input from the player on the touch screen;
   performing first collision determination processing that includes, when the operation target object is located within a first determination region set for a non-operation target object, which is an object different from the operation target object, so as to be located at a position overlapping the non-operation target object, determining that the operation target object has collided with the non-operation target object, changing a display form of the non-operation target object to a first display form, and performing first movement control on the operation target object;
   performing second collision determination processing that includes, when a touch input is performed in a state where the operation target object is located within a second determination region set for the non-operation target object so as to be wider in the predetermined direction and a direction orthogonal to the predetermined direction than the first determination region, determining that the operation target object has collided with the non-operation target object, changing the display form of the non-operation target object to the first display form, and performing second movement control, which is different from the first movement control, on the operation target object; and
   performing third collision determination processing that includes, when the operation target object is located within a third determination region set for the non-operation target object so as to be located at a side in a direction opposite to the predetermined direction with respect to a position of the first determination region and at a position adjacent to the first determination region, performing third movement control, which is different from the first movement control and the second movement control, on the operation target object such that the operation target object avoids a collision with the non-operation target object, wherein
   when a touch input is performed while the third movement control is performed, the display form of the non-operation target object is changed to the first display form in the third movement control without performing the process by the first collision determination processing and the process by the second collision determination processing.

18. A non-transitory computer-readable storage medium having stored therein a game program executed by a computer of a game system including a touch screen, the game program causing the computer to execute:
   automatically moving an operation target object that is an operation target of a player in a predetermined direction within a virtual space;
   displaying, on the touch screen, a game screen that scrolls so as to follow movement of the operation target object;
   performing predetermined movement control on the operation target object on the basis of a touch input from the player on the touch screen;
   performing first collision determination processing that includes, when the operation target object is located within a first determination region set for a non-operation target object, which is an object different from the operation target object, so as to be located at a position overlapping the non-operation target object, determining that the operation target object has collided with the non-operation target object, changing a display form of the non-operation target object to a first display form, and performing first movement control on the operation target object;
   performing second collision determination processing that includes, when a touch input is performed in a state where the operation target object is located within a second determination region set for the non-operation target object so as to be wider in the predetermined direction and a direction orthogonal to the predetermined direction than the first determination region, determining that the operation target object has collided with the non-operation target object, changing the display form of the non-operation target object to the first display form, and performing second movement control, which is different from the first movement control, on the operation target object; and
   performing third collision determination processing that includes, when the operation target object is located within a third determination region set for the non-operation target object so as to be located at a side in a direction opposite to the predetermined direction with respect to a position of the first determination region and at a position adjacent to the first determination region, performing third movement control, which is different from the first movement control and the second movement control, on the operation target object such that the operation target object avoids a collision with the non-operation target object, wherein
   when a touch input is performed while the third movement control is performed, the display form of the non-operation target object is changed to the first display form in the third movement control without performing the process by the first collision determination processing and the process by the second collision determination processing.

19. A game apparatus comprising:
   a touch screen;
   a processor; and
   a memory configured to store computer readable instructions that, when executed by the processor, cause the game apparatus to:
      automatically move an operation target object that is an operation target of a player in a predetermined direction within a virtual space;
      display, on the touch screen, a game screen that scrolls so as to follow movement of the operation target object;
      perform predetermined movement control on the operation target object on the basis of a touch input from the player on the touch screen;

when the operation target object is located within a first determination region set for a non-operation target object, which is an object different from the operation target object, so as to be located at a position overlapping the non-operation target object, perform first collision determination processing that includes determining that the operation target object has collided with the non-operation target object, changing a display form of the non-operation target object to a first display form, and performing first movement control on the operation target object;

when a touch input is performed in a state where the operation target object is located within a second determination region set for the non-operation target object so as to be wider in the predetermined direction and a direction orthogonal to the predetermined direction than the first determination region, perform second collision determination processing that includes determining that the operation target object has collided with the non-operation target object, changing the display form of the non-operation target object to the first display form, and performing second movement control, which is different from the first movement control, on the operation target object; and when the operation target object is located within a third determination region set for the non-operation target object so as to be located at a side in a direction opposite to the predetermined direction with respect to a position of the first determination region and at a position adjacent to the first determination region, perform third collision determination processing that includes performing third movement control, which is different from the first movement control and the second movement control, on the operation target object such that the operation target object avoids a collision with the non-operation target object, wherein when a touch input is performed while the third movement control is performed, the third collision determination processing changes the display form of the non-operation target object to the first display form without performing the process by the first collision determination processing and the process by the second collision determination processing.

* * * * *